Feb. 16, 1965    C. D. BURNEY    3,169,334
TRAWLERS AND TRAWLING
Filed July 5, 1963    4 Sheets-Sheet 1
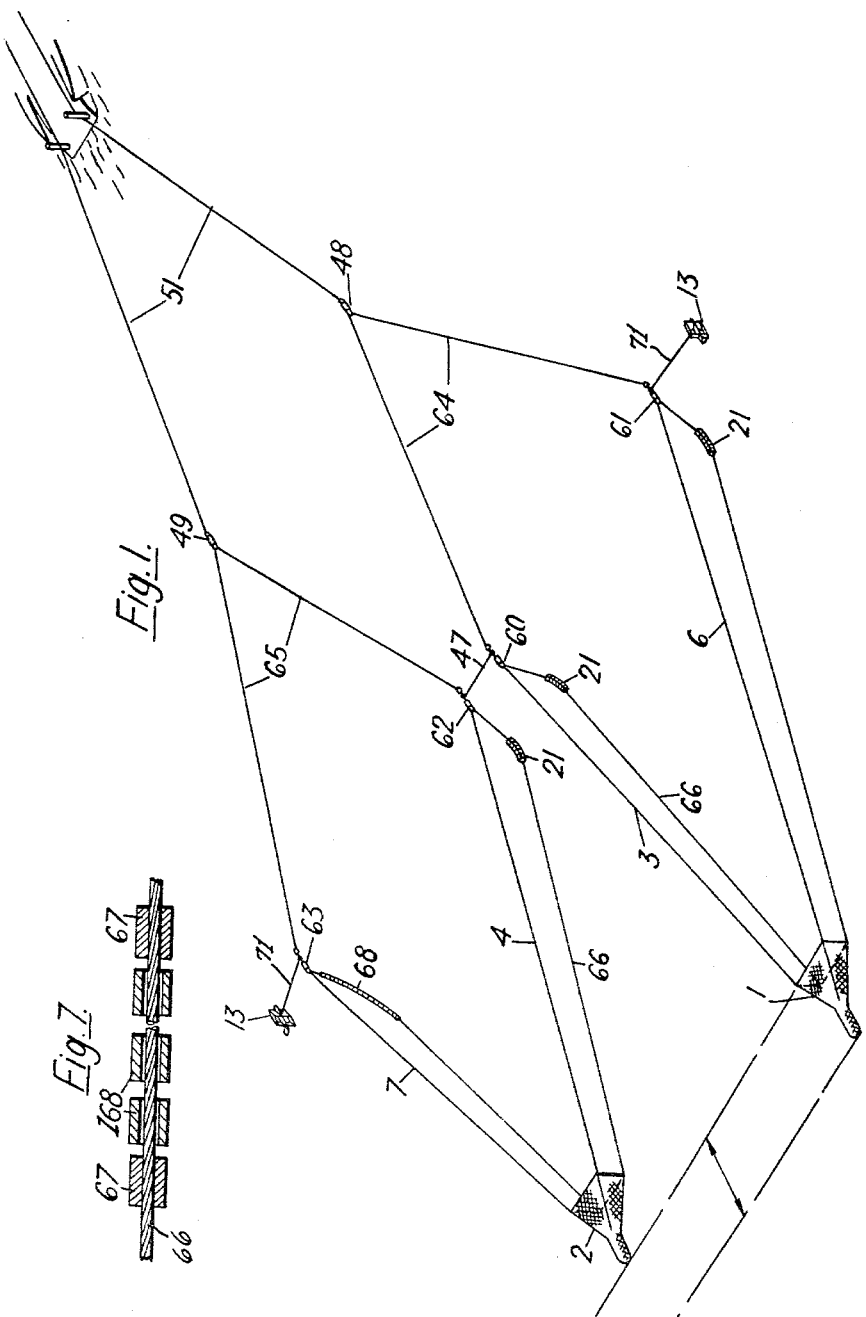
Inventor
CHARLES DENNISTOUN BURNEY
By Irwin S. Thompson
Attorney Feb. 16, 1965   C. D. BURNEY   3,169,334
TRAWLERS AND TRAWLING
Filed July 5, 1963   4 Sheets-Sheet 2

Inventor
CHARLES DENNISTOUN BURNEY
By Irwin S. Thompson
Attorney

Feb. 16, 1965  C. D. BURNEY  3,169,334
TRAWLERS AND TRAWLING
Filed July 5, 1963  4 Sheets-Sheet 3
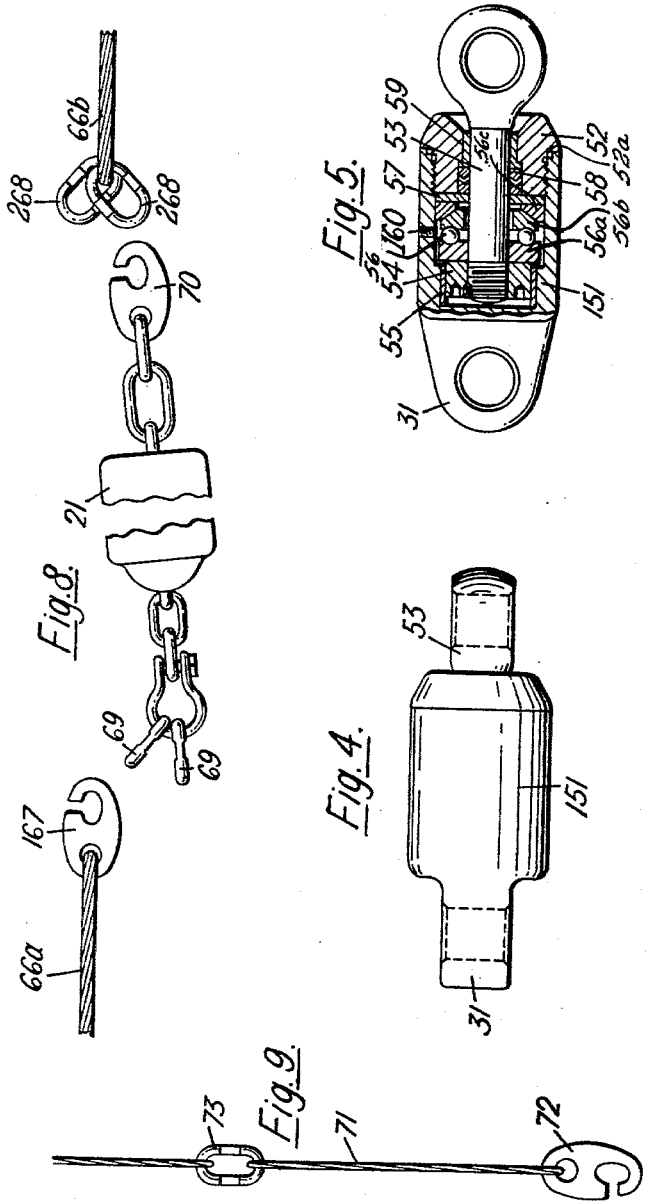
Inventor
CHARLES DENNISTOUN BURNEY
By Irwin D. Thompson
Attorney

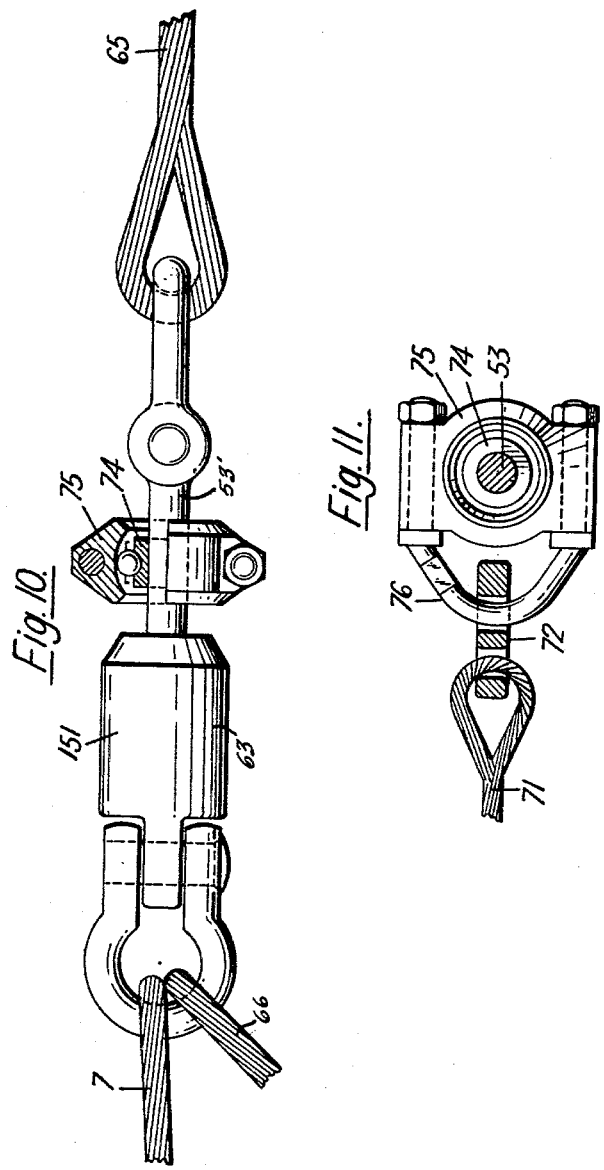

United States Patent Office 3,169,334
Patented Feb. 16, 1965

3,169,334
TRAWLERS AND TRAWLING
Charles Dennistoun Burney, 1 Chesham Place,
London SW. 1, England
Filed July 5, 1963, Ser. No. 293,032
10 Claims. (Cl. 43—9)

This invention relates to trawlers and trawling, and aims at providing a system of trawling, and preferred ancillary modifications of trawlers and trawling gear, which will facilitate and improve the catches taken up.

The invention is concerned with trawling systems in which two nets are trawled simultaneously from one vessel. Several prior proposals have been published for towing two nets simultaneously from a trawler, but for various reasons all have been found unsatisfactory. For example when two nets are connected together at their adjacent mouth edges difficulty is experienced in opening out the double-mouth of the nets in order to achieve an increased catch. Difficulties also arise in hauling in the double net, when loaded with a catch, and in letting out the array when commencing operations, due to fouling of the nets and towing cables, and of the otters and their towing warps (as well as to the increased load of a double net which must be hauled in during a single operation). Furthermore in present trawling practice there is attached, between each lower point of a net mouth and a forward point of a towing warp, a weighted ground line adapted to disturb the sea bed in order to form in the water clouded screens of mud, converging to the net mouth, tending to "herd" fish into the net, and with two nets connected together at their mouths it is difficult to ensure proper spread of the ground lines to achieve the desired effect. The ground lines also add to the difficulties of fouling of lines when the nets and otters are being streamed and hauled in.

The object of the present invention is to provide a trawling system which will overcome the defects and limitations of these previously described systems and with this end in view the invention consists in a trawling system comprising two nets adapted to be towed simultaneously, substantially in line abreast, by one trawler, wherein at each side of each net a towing warp connected to the upper corner of the net mouth, and a ground line connected to the lower corner of the net mouth extend forward and, at a point well in advance of the net, are connected together and to a forward towing warp, the two forward towing warps of each net extending to an advanced point where they are connected together and to a towing cable running to the trawler, the junctions of the towing warps and ground lines which run forward respectively from adjacent inner sides of the two nets being detachably connected together by a transverse link, and the junction of the towing warp and ground line which run forward from the outer side of each net being connected by a warp to a buoyant otter adapted, when being towed with the nets through the water, to provide a transverse force drawing the outer warps and ground lines of the nets in an outward direction and thus holding open the mouths of the nets.

The ground wires may be loaded with weights. This arrangement allows the nets to open out, and to assume positions separated by a considerable lateral distance when towed, while the ground wires fan out to present a wide spread double-V formation.

The connection of the otters well forward of the nets not only provides a well-spread array of the ground wires, but also enables the otters to be streamed and recovered before the nets.

In order to maintain the net mouths open if in any circumstances the effective lengths of the warps connected to the upper and lower corners of the net mouths should vary, the weights loaded on to the ground wires are preferably in the form of comparatively short units adapted to be fitted like beads on to a wire. In order to allow flexure these units may be shaped at their ends, e.g. a hemispherical nose at one end and a like recess at the other end, to fit together in a way which will allow relative rocking. The units are preferably of square or rectangular cross-section to avoid rolling about when stacked on the trawler deck. The warps by which the nets are towed are fitted with swivels capable of withstanding the heavy loads involved, while preventing twisting and/or intertwining upon any tendency of rotation.

Net arrangements such as indicated above are operated from a trawler having one or more rear chutes.

The invention will be clearly understood from the following description of forms (given, however, merely by way of example) which it may assume, and this description will be more readily followed by reference to the accompanying drawings wherein:

FIGURE 1 represents in perspective a preferred net arrangement in accordance with the invention;

FIGURES 4 and 5 represent views, corresponding to those of FIGURES 2 and 3 respectively, of an alternative form of swivel in accordance with the invention for use with trawling operations such as set out herein;

FIGURE 7 represents an enlarged detail of FIGURE 1;

FIGURE 8 represents arrangements in accordance with the invention for releasable connection and detachment of weights to and from a ground line, to facilitate the streaming and hauling in of a net;

FIGURE 9 represents a similar breaking point in an otter towing warp; and

FIGURES 10 and 11 represent respectively in side, part-sectioned view, and end view, a swivel arrangement for connection of an otter warp to a net warp.

Figure 3:
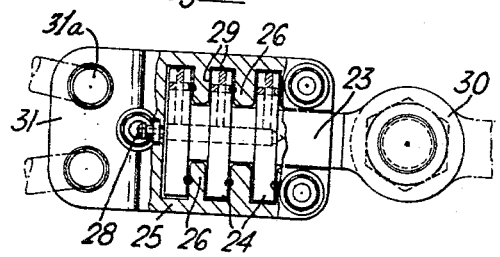
FIGURES 2 and 3 represent respectively side views in perpendicular planes, one partly in section, of a swivel in accordance with the invention for use with the net arrangement shown in FIGURE 1.

A preferred net arrangement in accordance with the invention is illustrated in FIGURE 1 of the aforesaid drawings. The upper corners of the mouths of two nets 1 and 2 are connected by warps 3, 6 and 4, 7 respectively to swivels 60, 61, 62 and 63, a representative one of which is shown in FIGS. 10 and 11. The swivels 60, 61 are connected by forward towing warps 64 to a common forward swivel 48, and the swivels 62, 63 likewise connected by warps 65 to a forward swivel 49. The swivels 48, 49 are connected to separate main towing cables 51. Two buoyant otters 13 are connected by warps, one each to the swivels 61 and 63, and the swivels 60 and 62 are detachably connected together by a transverse warp 47. Ground lines, such as 66, are connected between the swivels 60, 61, 62 and 63, and the corresponding lower corners of the mouths of the nets 1 and 2, and each may carry weights 21 well forward, i.e. near to the swivels. These weights may have flat surfaces to prevent rolling when not in use, as shown in FIG. 1. As illustrated the sets of warps connected to the nets are preferably of somewhat different length to allow one net to be hauled in, or streamed, in advance of the other. It will be seen that the nets are held open and well apart, and that the double-V arrangement of ground lines and weights ensure disturbances of the sea bed which herd fish into the net mouths.

Figure 2:
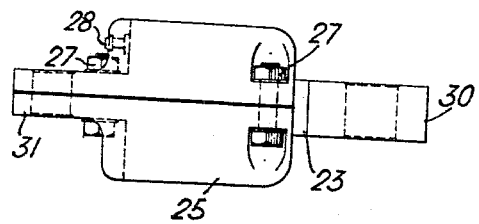

The swivels used in this array e.g. at the warp junctions and at 48, 49 are required to take a very heavy load, and to operate at pressure of, say, 1000 lbs. per square inch, and a preferred form of swivel for this purpose is shown in FIGURES 2 and 3. A rod 23 with two or more integral flanges 24 fits in a casing 25 having internal ribs 26 between which the flanges 24 engage, and against which they bear. The casing 25 is formed of two halves secured together by bolts 27. The bearing surfaces of the flanges 24 and ribs 26 are preferably chromium plated. A nipple 28 in the casing 25 communicates through an axial bore in the rod 23 with radial bores through the flanges 24 leading to bores in an axial direction through the flanges 24. The outer ends of the radial bores, and the ends of the bores through the flanges remote from the bearing faces are sealed, as at 29. Grease may be forced into the swivel from the nipple 28 through these ducts. The rod 23 terminates in a ring 30 to which a cable may be bolted, and the casing 25 has an extending plate 31 apertured to receive bolts 31a holding two or more cables or the like.

An alternative form of swivel in accordance with the invention is illustrated in FIGURES 4 and 5 herewith. A cylindrical casing 151 having at one end an integral apertured plate 31 as described above, is open at the other end and internally screw-threaded to receive a closure member 52. A sealing ring (not shown) may be located at 52a between the parts 151 and 52. The member 52 has an axial bore through which a swivel pin or rod 53 extends into the casing, having rigidly secured to its inner end a circular nut 54 which rides in a bushing 55 in a section of reduced diameter in the casing 151. A thrust bearing comprising annuli 56a, 56b, 56c with balls 56 between two of them is mounted on the pin 53 in the casing, and the inner face of this bearing is exactly flush with the shoulder of the swivel pin formed by the nut 54. A thrust washer 57 between the bearing 56c and closure member 52 holds the parts together in close but free-swiveling relationship. In an enlarged portion of the bore of the closure 52 is located a seal 58 round the pin 53, held compressed by a bushing 59. The casing is filled with grease through an inlet 160 provided.

Figure 6:
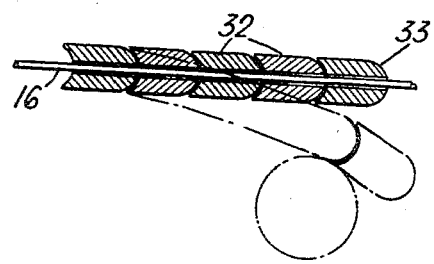
FIGURE 6 represents in side sectional view one form of weights in accordance with the invention for use with nets as shown in FIGURE 1.

To allow the weighted ground lines to accommodate themselves to varying conditions of operation, while keeping open the mouths of the nets it is desirable for the weights 21 to be flexible, and a preferred arrangement according to the invention is shown in FIGURE 6. Each load comprises a plurality of comparatively short metal units 32 having a longitudinal central bore through which can pass a warp or cable, e.g. 16, and at least one end 33 of each unit is of hemispherical form (FIGURE 6) to allow unobstructed flexing movement in relation to a neighbouring unit (as shown in dotted lines in FIGURE 6). The opposite end of each unit may be formed with a hemispherical or cupped recess as shown, to fit the curved end of the next unit.

In a trawling system in which the otter does not run on the sea bed, such as the system described above, the downward force taking the net to the sea bottom is obtained by placing weight on the forward part of the ground wire sufficient to take the net to the sea bottom. Between that weight and the net there is a distance of some hundreds of feet and this portion of the ground wire behind the main weight that take the net system to the sea bed also runs on the sea bed. Hitherto this wire has consisted of an ordinary steel wire and the strands of this ground wire are broken by the chafe of the wire on the sea bed. Consequently the "life" of this portion of the ground wire is limited. To overcome this defect according to another feature of the invention this portion of the ground wire is protected by steel ferrules 67 (FIG. 7) which are clamped on to the wire by hydraulic pressure at intervals and in between these clamped ferrules loose steel ferrules 168 are threaded on to the ground wire thus protecting the ground wire over its entire length. Another advantage is that the strength of the wire is thus protected by the steel ferrules and can be reduced so that it is the weakest link between the main weight and the net. In this way in the event of the system becoming fast on the sea bed due to obstruction this section of the ground rope will be the first to break. By making this portion of the ground wire in suitable detachable length the broken section can be replaced.

Another feature of the invention is that instead of making the main weights of considerable size so that they have to be detached from the warps prior to the other part of the warps behind the main weight being wound round the winch, a much greater number of small weights 68 (FIGURE 1) of the same type are attached to the warp. These may be wound round the winch thus avoiding the delay cause by taking the large weights off the warps, by the arrangements described above.

Referring again to FIGURE 1 it will be noted that the weights on the ground lines are located as far forward as possible from the net, the distance from which may, as stated above, be several hundred feet. This feature in association with the use of free-flying or buoyant otters ensures a much fuller opening of the net mouth than has previously been obtained with known systems (where non-buoyant otters have always been employed), and this combination can be used advantageously for single nets as well as for multiple-net arrays described above.

A difficulty encountered when trawling a net array such as illustrated in FIGURE 1 is that since the otters 13 and the ground weights 21 are mounted well forward of the nets they may be drawn on to a trawler (when a catch is being hauled in), before the net has reached the deck or the stern chute of the trawler, and may even reach the hauling winch before the net is drawn aboard and thus prevent further winching of the towing cable and warps.

In order to overcome this difficulty arrangements may be provided, according to the invention, for detachably connecting the weights and/or the otters to the warps. These arrangements allow the weights and/or the otters, when drawn aboard, to be disconnected from the warps, and thus offer no obstruction to the further winding of the warps on the winches to whatever extent is necessary to haul a net, with its catch, on to the fishing deck of the trawler.

Arrangements of this kind according to the invention are illustrated in FIGURES 8 and 9 of the aforesaid drawings.

In FIGURE 8 is shown a detachable weight arrangement. A ground line (such as line 66 in FIGURE 1) is broken and one end 66a terminates in a hook-like plate or clip 167 and the other end 66b has fitted thereon two rings or the like 268. A chain loaded with the weights 21 is provided at one end with two rings or the like 69, and at the other end with a hook-like plate or clip 70, thereby to provide a weight carrying detachable section. When trawling is in progress the hook or clip 167 is engaged with one of the rings 69, and the hook or clip 70 with one of the rings 268, to complete the ground line, which functions as illustrated in FIGURE 1. When the net is being hauled in the forward length 66a of the ground line is drawn in by the winch until the rings 268 advance to a strong point (e.g. a bollard having an attached chain with an end hook or clip similar to 70), and the free ring 268 is attached to this point which can then bear the strain of the rear length 66b of the ground line, and the net to which it is attached. The winch is then reversed to relieve the forward length 66a of the line, allowing the hook 70 and rings 69 to be detached, the chain and weights 21 removed, and the hook 167 connected to the ring 268 from which the hook 70 has been disconnected. The winch is then restarted to draw on the connected lines 66a and 66b, the ring 268 being detached from the strong point as soon as the winch takes the strain.

An arrangement for allowing detachment of an otter is shown in FIGURE 9. The otter is connected to a swivel by a warp 71 having at its end a hook-like plate 72, and at a point spaced from this hook 72 a ring 73. The hook 72 is hauled in with the net warps swivel to which it is attached until the ring 73 comes adjacent to a strong point on the trawler deck to which it is then attached. The winch is reversed to ease the strain on the hook 72 which is then disconnected from its swivel (the strain from the otter being taken up by the ring 73 and the strong point) whereafter the winch can haul in the net to the trawler deck while the otter remains towed by the ring 75 for subsequent independent retrieval.

It will be apparent that when a trawling operation is being commenced reverse procedures allow the weights and otters to be connected as the warps are being let out. Thus an otter can be streamed and held by a ring 73 at a strong point while the net is being released. When a linked hook 67 and one of the rings 68 reach a strong point, the free ring 68 can be attached to the strong point, the ground line broken, the chain and weights 21 fitted into it, and the strain taken up by the winch to allow release of a ring 68 from the strong point, whereafter the net warps and towlines can be further let out. Similarly the otter hook 72 can be connected to a swivel of the net warps, the strain taken by the winch to allow release of the ring 73 from the strong point, whereafter the otter is let out, with the net warps, under winch control.

In order to avoid the risk of the otter warp 71 becoming entangled with the net warps it is preferred to connect the otter warp to the junction of the net warps by swivel means, one convenient form of which is illustrated in FIGURES 10 and 11. The pin 53' of the net warp swivel 151 is lengthened as compared to FIG. 5 and has mounted thereon a ball race 74 on which is carried a sleeve or collar 75 to which is bolted a loop 76. The hooked plate 72 of the otter warp 71 is engaged with this loop 76, and it will be seen that since the collar 75 and pin 53' can rotate freely in relation to one another there is little risk of the warp 71 becoming wound round or entangled on the pin 53' or its associated net warps.

From the above description it will be seen that the invention provides effective means for increasing, and facilitating operations with, a catch of fish gathered in by a trawler, but it should be understood that the invention is not limited to the details of the forms described above, which may be modified in order to meet various conditions and requirements encountered, without departing from the scope of the invention.

What I claim is:

1. A trawling system including a plurality of nets for simultaneous towing by one trawler comprising two nets in spaced positions substantially in line abreast, at each side of each net a towing warp connected to the upper corner of the net mouth and a ground line connected to the lower corner of the net mouth, forward towing warps, the towing warp and corresponding ground line on each side of each net extending forward to a point well in advance of the net and there being connected together and to a forward towing warp, main towing cables, the two said forward towing warps of each net extending further forward to an advanced point where they are connected together and to a said main towing cable, a transverse link detachably connecting together the two junctions of towing warps and ground lines running forward respectively from adjacent inner sides of the two nets, two buoyant otters each having a connection warp and each linked by a said connecting warp to one of the junctions of ground lines and towing warps respectively running forward from the outer sides of the two nets, said buoyant otters, when being towed with the nets through the water, providing transverse forces drawing the outer warps and ground lines in an outward and upward transverse direction and thus holding the mouths of the nets laterally extended, and load weights mounted on each of said ground lines well forward of the nets, in the vicinity of the junction of the ground line and towing warp, in order both to hold the net mouths open vertically and to drag over the sea bed in widely spaced positions well in advance of the net.

2. A trawing system in accordance with claim 1 comprising a swivel connection between an upper towing warp connected to a net, and a forward towing warp connected to a towline.

3. A trawling system in accordance with claim 1 incorporating between an upper towing warp connected to a net, and a forward towing warp connected to a towline, a swivel connection comprising two cooperating components each provided with a loop for connecting said warps thereto, thrust members urged together by said cooperating components, and bearing balls between said thrust members.

4. A trawling system in accordance with claim 1 incorporating, in an otter-towing link, swivel connecting means comprising an inner ball-race carrying balls, and mounted on said balls an outer collar having means for connecting the said otter-towing warp thereto.

5. A trawling system according to claim 1 wherein said load weights comprise a plurality of bored masses threaded on to said ground line, the ends of said masses in juxtaposition being of curved cooperating shapes to allow relative rocking of adjacent contacting masses in accordance with flexing of the ground line on which they are threaded.

6. A trawling system according to claim 1 wherein said ground line is provided with weights of sufficiently small size to allow the said line with said weights thereon to be wound on to a winch.

7. A trawling system according to claim 1 comprising on said ground line load weights that have at least one flat side surface for non-rolling support on a flat surface when not in use.

8. A trawling system according to claim 1 wherein the ground line includes a weight-carrying detachable section.

9. A trawling system according to claim 1 comprising means on the otter-towing warp for detachable connection of the warp to the said junction of the net-towing warp and a ground line.

10. A trawling system according to claim 1 comprising ferrules threaded on to said ground line for protection against chafing and damage by the sea bed.

References Cited by the Examiner

FOREIGN PATENTS 376,230 12/30 Great Britain.
788,237 12/57 Great Britain.

ABRAHAM G. STONE, Primary Examiner.

F. RAY CHAPPELL, Examiner.